United States Patent Office 3,634,320
Patented Jan. 11, 1972

3,634,320
PROTECTION OF ORGANIC SUBSTANCES
AGAINST UV RADIATION
Wolfgang Metzner, Krefeld, and Gunter Peilstocker,
Krefeld-Bockum, Germany, assignors to Farbenfabriken
Bayer Aktiengesellschaft, Leverkusen, Germany
No Drawing. Filed Sept. 24, 1969, Ser. No. 860,823
Claims priority, application Germany, Oct. 4, 1968,
P 18 01 221.0
Int. Cl. C08f *45/58;* C08g *51/58*
U.S. Cl. 260—45.85 R       2 Claims

ABSTRACT OF THE DISCLOSURE

The use of compounds of the formula

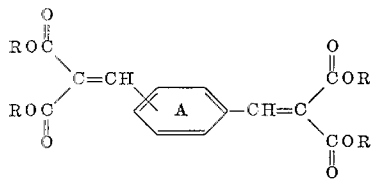

in which R stands for an optionally substituted alkyl, cycloalkyl, aralkyl or aryl radical, and the ring A may contain further substituents, for the protection of organic materials against the effect of UV rays.

---

The subject-matter of the present invention is the use of compounds of the general formula

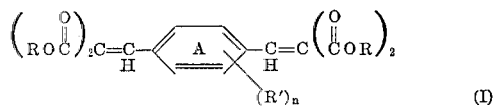

in which R stands for an optionally substituted alkyl, cycloalkyl, aralkyl or aryl radical, and the ring A may contain as an optional substituent, up to four radicals represented by R' as an alkyl or halogen atom, for the protection of organic materials against the effect of UV rays.

The radicals R may be identical or different. Suitable radicals R, are, for example, methyl, ethyl, propyl, hexyl, dodecyl, cyclohexyl, benzyl, phenyl radicals, and phenyl radicals which may be substituted by halogen, alkyl and alkoxy radicals.

Suitable substituents for A are, for example, halogen or alkyl.

Preferred compounds within the scope of the Formula I are those of the formula

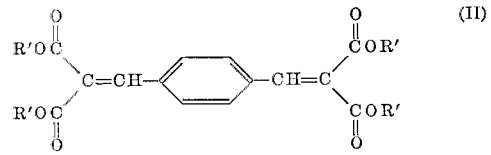

or of the formula

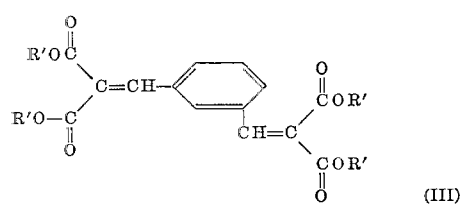

in which R' has the same meaning and stands for an unsubstituted alkyl radical with 1–20 carbon atoms, a cyclohexyl, benzyl or phenyl radical.

Examples are compounds of the Formula II in which R' stands for ethyl, n-dodecyl, cyclohexyl, benzyl and phenyl.

The compounds to be used according to the invention some of which are known, can be obtained, for example, by condensing dialdehydes of the formula

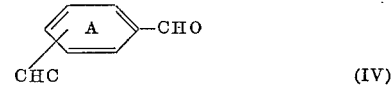

in which the ring A may contain further substituents, with malonic acid esters of the formula

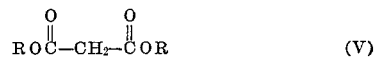

Suitable aldehydes (IV) are, for example, terephthalaldehyde, isophthalaldehyde, 2-chloro-terephthalaldehyde, 2-fluoro-terephthalaldehyde, 2-methyl-terephthalaldehyde, 2,3-dichloro-terephthalaldehyde, 2,5-dichloro-terephthalaldehyde, 2,5-dimethyl-terephthalaldehyde, tetramethyl-terephthalaldehyde, 2,5-dimethoxy-terephthalaldehyde, 4-methoxy-isophthalaldehyde, 5-methyl-isophthalaldehyde, tetramethyl-isophthalaldehyde.

Suitable malonic acid esters (V) are, for example, malonic acid dicyclohexyl ester, malonic acid dibenzyl ester, malonic acid diphenyl ester, malonic acid dimethyl ester, malonic acid methyl ester ethyl ester, malonic acid diethyl ester, malonic acid methyl ester propyl ester, malonic acid dipropyl ester, malonic acid di-(3-chloropropyl)-ester, malonic acid diisopropyl ester, malonic acid dibutyl ester, malonic acid di-sec.-butyl ester, malonic acid diisobutyl ester, malonic acid di-tert.butyl ester, malonic acid pentyl ester, malonic acid dihexyl ester, malonic acid dioctyl ester, malonic acid dinonyl ester, malonic acid didecyl ester, malonic acid didodecyl ester, malonic acid dioctadecyl ester, malonic acid methyl ester phenyl ester.

The compounds to be used according to the invention are especially suitable UV-absorbers for polymers such as polystyrenes, polyacrylonitriles, polyacrylates and their copolymers, polydienes, e.g. polybutadiene, polyvinyl chloride, polyvinylidene chloride, polypropylene, polyethylene, polyesters, e.g. polyethylene terephthalate, polycarbonate, polyamide, e.g. polycaprolactam and polyurethanes, polyethers, e.g. polysulphone; they are primarily suitable for polymers which are processed at elevated temperatures, e.g. above 150° C. The compounds to be used according to the invention are added to the polymers in quantities of up to about 5%, preferably in quantities of 0.1–2.0%.

The incorporation of the compounds according to the invention can be carried out according to the processes known from the literature, for example, by mixing them with the polymers before these are further processed at an elevated temperature by addition to the melt of the polymers, or by adding them to the suspended or dissolved polymers during processing. If desired, they may also be added to the starting materials serving for the preparation of the polymers, and they do not lose their absorption power, even in the presence of other conventional light and heat stabilisers, oxidising and reducing agents and the like.

Admittedly, methylene-malonic acid derivatives have already been proposed as UV-absorbers but, compared with the corresponding compounds described in German patent specification No. 1,087,902 or in Belgian patent specification No. 684,526, the substances according to the invention are characterised by high molar extinction coefficients or by absorption of longer waves; they are also colourless. The claimed compounds also compare favourably with the known UV-absorbers containing hydroxyl groups, such as benzophenone and benzotriazole derivatives, due to their low sensitivity to alkali. These properties in combination with a high thermal and photochemical stability and high resistance to sublimation render the compounds (I) particularly suitable as UV-absorbers for organic materials which are stable to high temperatures. For example, they can be incorporated with polycarbonate at 300–350° C. without giving rise to a change of colour of the polycondensate; consequently, the use of heat stabilisers, as recommended in French patent specification No. 1,487,593 to increase the thermal stability of the UV-absorbers, can be dispensed with.

EXAMPLE 1

A polycarbonate consisting of poly-[4,4'-dihydroxy-diphenyl-2,2-propane]-carbonate with a relative viscosity of 1.30 (0.5% solution in methylene chloride at 25° C.) is mixed with 0.5% by weight of one of the compounds listed in the following table and, after homogenisation at 300° C., worked up in the usual manner to produce a granulate. The polycarbonate thus treated is colourless and excellently stabilised against the effect of UV rays.

TABLE 1.—COMPOUNDS OF THE FORMULA:

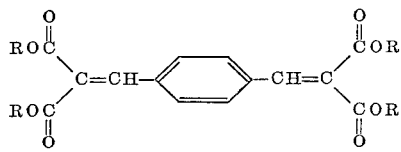

| Compound No. | Empirical formula | R | M.P. (° C.) | $\lambda_{max}$ (mμ) | $\xi$ (1/mol. cm.) |
|---|---|---|---|---|---|
| | $C_{22}H_{26}O_8$ | Ethyl | 136–138 | 318 | 41,000 |
| | $C_{62}H_{106}O_8$ | Dodecyl | 61–62 | 318 | 36,500 |
| | $C_{38}H_{50}O_8$ | Cyclohexyl | 100–102 | 318 | 40,000 |
| | $C_{42}H_{34}O_8$ | Benzyl | 109–110 | 321 | 39,000 |
| | $C_{38}H_{26}O_8$ | Phenyl | 179–181 | 325 | 32,500 |
| | $C_{38}H_{58}O_8$ | n-Hexyl | 65–66 | 318 | 39,000 |

EXAMPLE 2

Determination of the thermal stability in the polycarbonate in comparison with known UV-absorbers:

100 kg. of a polycarbonate (poly-[4,4'-dihydroxydiphenyl-2,2-propane]-carbonate) with a relative viscosity of 1.30 (measured on a 0.5% solution in methylene chloride at +25° C.) were divided into 11 equal portions. Ten of the eleven portions were admixed by conventional methods with 0.5% by weight of one of the compounds 1–11 of the following Table 2 (the compounds 2–5 are conventional UV-absorbers), and the mixtures were homogenised by means of a two-shaft extruder at a temperature of 300° C., and extruded as a wire of approximately 2.5 mm. diameter. The wire was subsequently cut into pieces of about 3 mm. length. The granulates prepared in this way were worked up by means of a commercial injection moulding machine at a temperature of 320° C., measured as the temperature of the melt, to produce test pieces of the dimensions 60 x 50 x 4 mm. The 11th portion served as control and contained no UV-absorber. The measured percentage values for the light transmission of the test pieces so obtained at a wave length of 420 mμ (standard light C according to DIN 5033) are assembled in Table 2:

TABLE 2—LIGHT TRANSMISSION VALUES OF POLYCARBOHYDRATE SAMPLES [1]

| Sample No. | UV-absorber | M.P. (°C.) | Light transmission (percent) |
|---|---|---|---|
| 1 | Blank test without additive | | 84 |
| 2 | 2-(2'-hydroxy-5'-methylphenyl) benzotriazole. | 130–132 | 75 |
| 3 | 2,2'-dihydroxy-4-methoxy-benzophenone. | 68–70 | 20 |
| 4 | 2,2'-dihydroxy-4-n-octoxy-benzophenone. | 90.5–92.0 | 40 |
| 5 | α-Cyano-β-methyl-p-methoxy-cinnamic acid methyl ester. | 65–85 | 12 |
| 6 | p-Phenylene-bis-(methylene-malonic acid diethylester). | 136–138 | 81 |
| 7 | p-Phenylene-bis-(methylene-malonic acid dicyclohexylester). | 100–102 | 79 |
| 8 | p-Phenylene-bis-(methylene-malonic acid dibenzylester). | 109–110 | 82 |
| 9 | p-Phenylene-bis-(methylene-malonic acid diphenylester). | 179–181 | 76 |
| 10 | p-Phenylene-bis-(methylene-malonic acid di-n-dodecylester). | | 82 |
| 11 | m-Phenylene-bis-(methylene-malonic acid diethylester). | 101–103 | 79 |
| 12 | m-Phenylene-bis-(methylene-malonic acid dodecylester). | 35–39 | 81 |
| 13 | m-Phenylene-bis-(methylene-malonic acid dibenzylester). | 99–100 | 77 |

[1] Thickness of sample 4 mm., wave length 420 mμ.

As can be seen from Table 2, the test pieces of samples 6–11 containing, by way of example, some of the compounds to be used according to the invention, show the highest values for light transmission at a wavelength of 420 mμ, i.e. these products have an excellent thermal stability at the high processing temperature of 320° C. and permit of the production of UV-stabilised moulding masses or mouldings of polycarbonate with a very slight inherent colour.

The superiority of the compounds to be used according to the invention can also be seen from the weathering and illumination tests. For this purpose, the samples 1, 2 and 6 given in Table 2 were weathered for 1000 hours in a weather-o-meter and illuminated for 3000 hours with a high pressure mercury vapour lamp HQL (250 watt) under comparable conditions. A certain yellowing of the samples occurred. The yellowing factors of the test pieces were determined as a quantitative value according to the following equation $$VF = \frac{T_{640\ m\mu} - T_{450\ m\mu}}{T_{560\ m\mu}} \times 100$$

(T=light transmission of the test pieces). Table 3 shows that the yellowing factor of the samples containing one of the compounds to be used according to the invention p-phenylene - bis-(methylene-malonic acid-diethyl-ester), after weathering and illumination, is lower than that obtained with a benzotriazole derivative 2-(2'-hydroxy-5'-methyl-phenyl)-benzotriazole.

TABLE 3.—WEATHERING AND ILLUMINATION OF TEST PIECES OF POLYCARBONATE

| Sample No. | UV-absorber | Addition (percent by weight) | Yellowing factors Previously | after 1,000 hours' weather-o-meter | (VF) after 3,000 hours' illumination (HQL 250 w.) |
|---|---|---|---|---|---|
| | | | 4.5 | 12 | |
| | | | 4.5 | | 58 |
| | 2-(2'-hydroxy-5'-methylphenyl)-benzotriazole | 0.5 | 8.1 | 9.3 | |
| | do | 0.5 | 8.1 | | 44 |
| | p-Phenylene-bis-(methylene malonic acid diethyl-ester) | 0.5 | 6.8 | 7.9 | |
| | do | 0.5 | 6.8 | | 37 |

What is claimed is:

1. Organic synthetic polymers protected against the effect of UV rays by reason of the presence therein of compounds of the formula

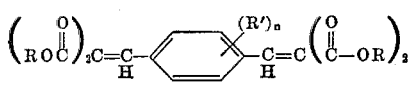

in which R is selected from the group consisting of alkyl, chloroalkyl, cycloalkyl, aralkyl, aryl, haloaryl, alkylaryl and alkoxyaryl, R' represents a member selected from the group consisting of halogen, methoxy and alkyl, and $n$ is 0 or an integer not exceeding 4.

2. Materials according to claim 1 in which R is selected from the group consisting of an alkyl radical of 1 to 20 carbon atoms, cyclohexyl, benzyl, phenyl, halophenyl, alkylphenyl, alkoxyphenyl and a chloroalkyl radical of 1 to 20 carbon atoms.

References Cited

UNITED STATES PATENTS 3,244,668  4/1966  Knapp et al. _____ 260—45.85

FOREIGN PATENTS 1,087,902  8/1960  Germany _____ 260—45.85
1,487,593  7/1967  France _____ 260—45.85

DONALD E. CZAJA, Primary Examiner

V. P. HOKE, Assistant Examiner

U.S. Cl. X.R.

252—300 R; 260—2.5 AI, 45.85 R, 475 SC